Jan. 6, 1931.　　　H. J. SCHMIDT　　　1,787,840
ATTACHMENT FOR HONEYCOMB FRAMES
Filed Jan. 17, 1930
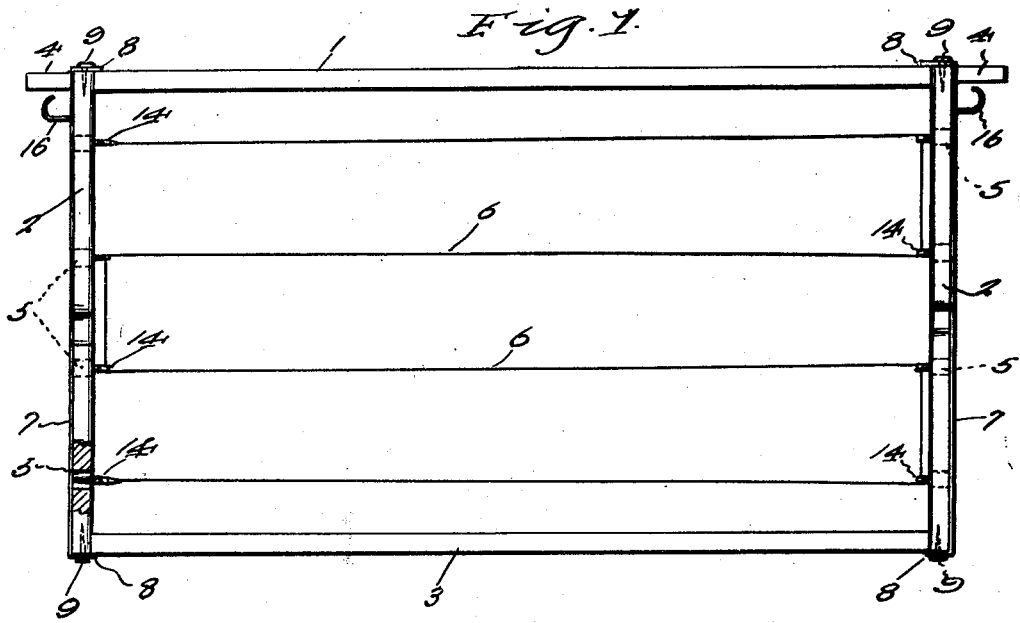
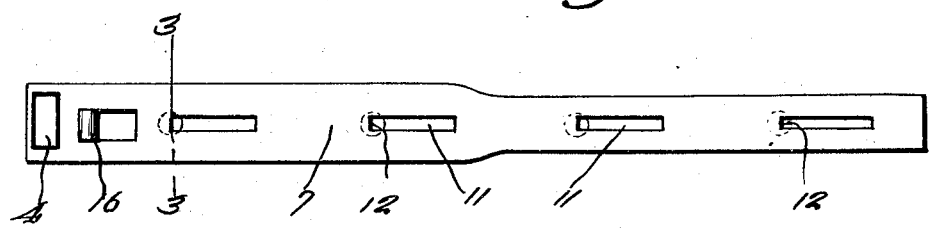
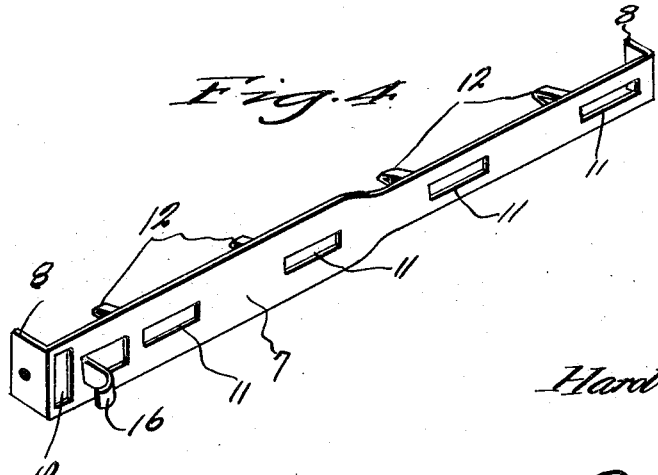
Inventor
Harold J. Schmidt
By Clarence A. O'Brien
Attorney Patented Jan. 6, 1931

1,787,840

UNITED STATES PATENT OFFICE

HAROLD J. SCHMIDT, OF HOMESTEAD, IOWA

ATTACHMENT FOR HONEYCOMB FRAMES

Application filed January 17, 1930. Serial No. 421,457.

This invention relates to an attachment for honeycomb frames of the type including upper and lower horizontal bars connected together, at their opposite ends, by a pair of vertical end bars having spaced transverse openings therethrough for the passage of a strand of wire which supports the artificial honeycomb base sheet in the frame but it is to be understood that an attachment constructed in accordance with this invention may be used in connection with any type of honeycomb frame for which the same is found adapted.

In honeycomb frames of the aforementioned character which are in widespread use at present, the strand of wire which supports the comb base sheet is threaded through the openings in the wooden end bars and trained back and forth therebetween in a zig-zag manner between the upper and lower bars of the frame. This strand of wire is necessarily drawn taut in order to properly support the base sheet with the result that the same cuts into the comparatively soft wood of the end bars adjacent the openings therein and the wire becomes loose and sags thus necessitating frequent tightening thereof. In addition to the foregoing, the threading of the wire through the openings in the end bars entails the expenditure of considerable time and labor, as will be obvious.

Another conventional structural feature of honeycomb frame of the aforementioned character resides in the provision of integral extension on the upper bar of the frame which projects through notches or recesses formed in the upper end of the end bars and projects laterally therebeyond to provide supporting butts adapted for disposition in channels in the hive for supporting the frame in suspended position. This construction and arrangement often results in the upper bar being pulled away from or detached from the end bars with the result that the rest of the frame is allowed to drop in a manner to damage the honeycombs thereon and injuring or killing the bees and this is particularly true when the hive is being shipped from one point to another.

An important object of this invention is to provide, in a manner as hereinafter set forth, an attachment for honeycomb frame which will greatly facilitate the application of the strand of supporting wire thereto and which will support said wire in such manner that the same will remain taut.

Another important object of the invention is to provide, in a manner as hereinafter set forth, an attachment of the aforementioned character which will obviate the necessity of threading the wire through the holes in the end bars of the frame and which may be quickly and easily mounted in position thereon.

Another important object of the invention is to provide an attachment for honeycomb frames which embodies means for reinforcing and materially strengthening the joint between the upper supporting bar and the end bars.

A still further object of the invention is to provide an attachment for honeycomb frames having means thereon for maintaining the end bars of the frame in spaced relation with respect to the side of the hive upon which the frame is mounted.

Still further objects of the invention are to provide an attachment for honeycomb frames of the aforementioned character which will be simple in construction, strong, durable, efficient in its use and which may be manufactured at low cost.

The foregoing and still further objects and advantages of the invention will become apparent from a study of the following specification, taken in connection with the accompanying drawings, wherein like characters of reference designate corresponding parts throughout the several views, and wherein:—

Figure 1 is a view in front elevation showing a portion thereof broken away in section of a conventional honeycomb frame with the attachment constituting this invention mounted in position thereon.

Figure 2 is a view in elevation of the invention.

Figure 3 is a cross-sectional view taken substantially on the line 3—3 of Figure 2.

Figure 4 is a perspective view of the device detached from the frame.

Referring to the drawings in detail, the reference character 1 designates the upper horizontal bar of a conventional rectangular honeycomb frame from the opposite ends of which depend the end bars 2—2 between the lower end portions of which extend the lower horizontal bar 3. It is understood, of course, that the abutting ends of the bars 1, 2—2 and 3, are secured together. The opposite ends of the upper bar 1 are provided with reduced integral extensions 4—4 which extend through notches or recesses provided in the upper ends of the end bars 2—2 and project laterally therefrom to provide supporting butts for engagement in channels or grooves provided in opposite side of a bee hive for supporting the frame in suspended position. The end bars 2—2 are provided with vertically spaced openings 5 through which the strand of wire 6 has heretofore been threaded. All of the foregoing is conventional and forms no part of this invention.

The device constituting this invention includes an elongated flat strip 7, preferably of metal, one of which is adapted to be disposed against the outer side of each of the end bars 2—2 of the frame as clearly illustrated in the drawing. The opposite ends of the strip 7 are provided with integral, inwardly turned, right angularly disposed apertured extensions or ears 8—8 which extend over the upper and lower sides of the frame and are anchored thereto through the medium of the securing elements 9 which extend through the aperture therein. The upper end portions of the strip 7 are provided with transverse slots 10 for the passage of the butts 4. It is understood that the extensions 8 may be of any desired length.

Spaced longitudinally extending slots 11 are formed in the strip 7 and the material struck out to form the slots is bent inwardly and formed into a series of hooks 12 having a twisted shank portion 13, said hooks further including a resilient bill portion 14 which is normally in yielding engagement with an angular intermediate portion 15, of the hooks. The hooks 12 are adapted to extend through the holes 5 in the end bars 2—2 of the frame, as clearly illustrated in Figures 1 and 3 of the drawing.

Adjacent the transverse slots 10 the strips 7 are further provided with integral outwardly extending spacing arms 16 having up-turned end portions for engagement with the side walls of the bee-hive for maintaining the frame in spaced relation thereto at all times.

As illustrated to advantage in Figure 1 of the drawing, the strand of wire 6 is anchored to one of the upper or lower hooks on one of the end bars and is then drawn back and forth across the frame in a zig-zag manner and engaged in the rest of the hooks in the proper order and has its other end secured to the last hook, as will be understood. The construction of the hooks 12 permits an intermediate portion of the strand of wire to be readily engaged therewith by inserting said wire between the free end portion of the bill 14 and the opposed portion of the shank 13 and then drawing said wire toward the outer end of the hook in a manner to spring said bill portion 14 outwardly to permit the passage of the wire. It will also be seen that this construction of hook will also retain the wire in place therein after the same is inserted.

By extending the butts 4 through the transverse slots 10 of the strips 7 and anchoring the uppermost extension 8 to the upper side of the frame, means is provided for effectively preventing the separation of the upper bar 1 from the respective end bars 2.

It is believed that the many advantages of an attachment for honeycomb frame constructed in accordance with this invention will be readily undertsood, and although the preferred embodiment of the invention is as illustrated and described, it is to be understood that changes in the details of construction may be had which will fall within the scope of the invention as claimed.

What is claimed is:—

1. An attachment for honeycomb frames of the type including end bars having openings therein, comprising a supporting strip, and hooks mounted on the strip and adapted to extend through the openings for engagement with a comb base sheet supporting wire.

2. An attachment for honeycomb frames of the type including end bars each having a series of openings therein, comprising an elongated supporting strip adapted to be mounted on the outer side of the end bars and a series of spaced hooks mounted on the supporting strip and adapted to extend through the openings in the end bars for engagement with a comb base sheet supporting wire.

3. An attachment for honeycomb frames of the type including end bars each having a series of vertically spaced openings therein, comprising an elongated flat supporting strip adapted to be mounted longitudinally on the outer side of each of said end bars, and a series of spaced integral hooks struck out from the supporting strip and adapted to extend through the openings in the end bars and into the frame for engagement with a comb base sheet supporting wire.

4. An attachment for honeycomb frames of the type including end bars having openings therein, comprising a supporting strip, and hooks mounted on the strip and adapted to extend through the openings for engagement with a comb base sheet supporting wire, said hooks having an angularly disposed intermediate portion and a rearwardly extending resilient bill portion yieldingly engaged with the angular portion.

5. An attachment for honeycomb frames of the type including end bars having openings therein, and an upper bar having supporting butts extending outwardly therefrom, comprising a supporting strip, hooks mounted on the strip adapted to extend through the openings for engagement with a comb base sheet supporting wire, said strip being provided with a slot for the passage of the adjacent supporting butt and angularly disposed extensions on the opposite ends of the strip for engagement over the upper and lower sides of the frame.

6. An attachment for honeycomb frames of the type including end bars each having a series of spaced openings therein, said frame further including an upper bar having integral supporting butts extending outwardly therefrom, comprising an elongated, flat, metallic supporting strip, a series of spaced integral hooks struck out from the supporting strip and adapted to extend through the openings in the end bars and into the frame for engagement with a comb base sheet supporting wire, said strip being provided with a transverse slot adjacent one end for the passage of the supporting butts, inwardly directed angular extensions on the opposite ends of the strip for engagement over the upper and lower sides of the frame, securing elements passing through the extensions for anchoring the strip on the frame, and outwardly extending integral spacing arms struck out from the strip adjacent the transverse slot therein.

In testimony whereof I affix my signature.

HAROLD J. SCHMIDT.